March 19, 1940.  H. S. BEGG  2,194,002
ADJUSTABLE SHOCK ABSORBER
Filed June 7, 1938
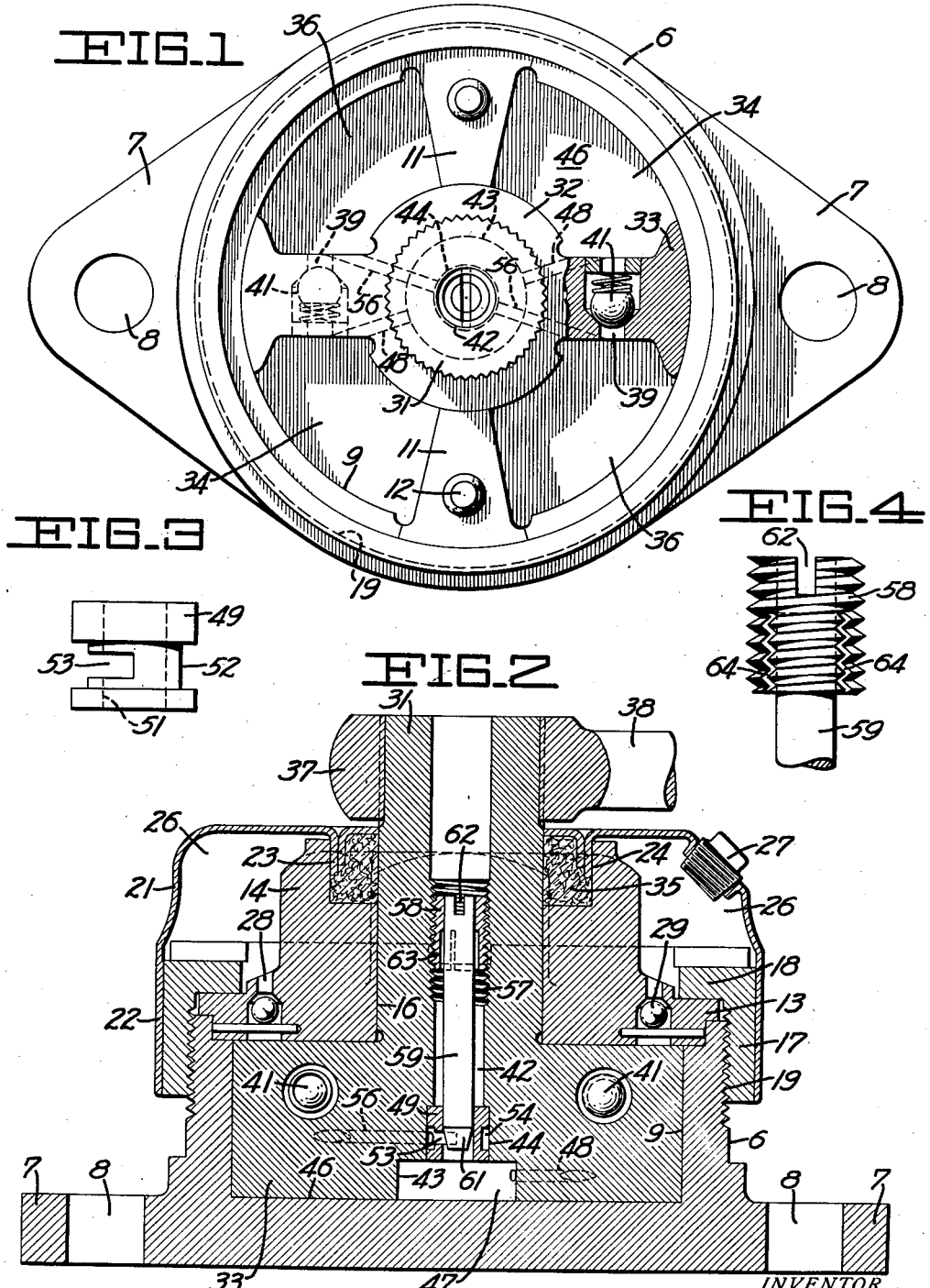
INVENTOR
BY Hugh S. Begg
Harry C. Schweda
ATTORNEY Patented Mar. 19, 1940

2,194,002

UNITED STATES PATENT OFFICE 2,194,002

ADJUSTABLE SHOCK ABSORBER

Hugh S. Begg, Oakland, Calif.

Application June 7, 1938, Serial No. 212,283

1 Claim. (Cl. 188—89)

This invention relates to shock absorbers and particularly to those of the fluid displacement type.

It is an object of the invention to provide, in a device of the character described, a novel by-pass valve construction which permits more ready adjustment of the shock absorber and more efficient operation thereof.

Another object of the invention is to provide, in a device of the class referred to, an improved by-pass valve which will perpetuate an adjustment once it is made regardless of how severe a vibratory force is imposed on the shock absorber.

A further object of the invention is to provide, in a shock absorber of the fluid displacement type, a simplified and rugged by-pass valve structure.

The invention possesses other objects and features of advantage some of which, together with the foregoing, will be specifically set forth in the detailed description of the invention hereunto annexed. It is to be understood that the invention is not to be limited to the specific form thereof herein shown and described as various other embodiments thereof may be employed within the scope of the appended claim.

Referring to the drawing:

Figure 1 is a top plan view of the assembled rotor and stator elements only of a shock absorber incorporating the improvements of my invention. A portion of the view is shown in section so as to more clearly disclose the internal construction.

Figure 2 is a vertical sectional view of a complete shock absorber, of which the elements shown in Figure 1 form a part, showing the improvements of my invention incorporated therein.

Figure 3 is an enlarged side elevational view of the by-pass valve bushing.

Figure 4 is an enlarged fragmental side elevational view of the top portion of the valve stem.

Most of the shock absorbers used on automobiles at the present time are of the hydraulic type, a typical one of which is shown in the drawing, comprising a body 6 provided with flanges 7 having apertures 8 therein for the reception of bolts by means of which the body may be attached to a structure such as the frame of the automobile. Formed within the body 6 is a circular recess 9, and a pair of diametrically opposed abutments 11, secured to the body by pins 12 or in any other suitable manner, extend from the sides of the recess radially toward the center thereof. The vertical height of these abutments is equal to the depth of the recess.

Mounted on the body 6 and closing the top of the recess 9 is a cover plate 13, having a hub 14 rising centrally thereof, which is provided with an axial bore 16. A ring nut 17, having a flange 18 overlying the cover plate, is attached to the body by means of screw threads 19 and holds the cover plate in position. Overlying the ring nut 17 is a sheet metal hood 21 whose skirt portion 22 snugly contacts the outer periphery of the nut so as to provide a fluid tight joint and which is provided with a central aperture having a peripheral flange 23 which rests in a depression 24 formed in the upper end of the hub 14. This hood, in conjunction with the nut 17 and the hub 14, provides a closed reservoir 26 into which fluid, preferably light oil, may be introduced through a suitable filler opening closed by a threaded plug 27. From the reservoir the fluid passes into the recess 9 through passages 28, provided in the cover plate 13, closable by ball check valves 29. These check valves are so constructed that when equalized pressures exist in the recess 9 and the reservoir 26 fluid may flow from the latter into the former. However, if the pressure in the recess exceeds that in the reservoir the valves will be forced closed thereby shutting off the flow of fluid from the reservoir.

Extending through and journaled for rotary motion in the bore 16 of the hub 14 is a shaft 31 whose inner end, within the recess 9, is provided with a cylindrical head 32, which peripherally contacts the confronting ends of the abutments 11 so as to divide the recess into a pair of arcuate cylinders, and from which extends a pair of diametrically oppositely directed arms or pistons 33 which terminate in sliding contact with the curved walls of the recess 9. These pistons serve to divide each of the cylinders above mentioned into a pair of separate compartments 34 and 36. The other end of the shaft 31 is extended, through a suitable stuffing box 35, occupying the recess 24, beyond the hood 21 and is splined to receive the hub 37 of a lever 38 which is connected in the usual manner with one of the spring-supported axles of the vehicle so that up-and-down movement of the axle will be translated into rotational movement of the shaft 31. This will cause the pistons 33 to move along their arcuate cylinders tending to compress the fluid contained in either of the compartments 34 or 36 thereof.

The action of shock absorbers is to offer but little resistance to upward movement of the axle and considerable resistance, depending upon the degree of flexibility of the vehicle springs, to rebound movement of the axle. By providing passages 39, normally closed by spring-pressed ball valves 41, in each of the pistons 33 the flow of fluid from the chambers 36 into the chambers 34 may progress rapidly thereby offering but small resistance to clockwise rotation of the shaft 31, as viewed in Figure 1, while changing the rotation of the shaft to a counterclockwise direction will force the valves 41 to close under the pressure of the compressed fluid contained in the chamber 34 thereby offering a maximum of resistance to turning of the shaft in the latter direction. In order to allow any counter-clockwise rotation of the shaft, the fluid in the chamber 34 must be allowed to return into the chamber 36. The rate at which this transference of fluid takes place determines the resistance of the shock absorber.

In most shock absorbers the fluid is allowed to flow from the chamber 34 to the chamber 36 through small passages, drilled in the head 32 of the shaft 31, which flow is regulated by a slender adjustable needle valve adapted to be advanced concentrically into a port provided in one of the conduits through which the fluid passes. Considerable difficulty has been experienced among service men in properly adjusting shock absorbers equipped with these slender valves. In the first place, the thin valve stem, either during or after manufacture, is likely to be bent so that when it is installed in the shock absorber it will be in eccentric registry with the valve port. Fine adjustment of a valve in this condition is at best very difficult and, in some instances, impossible. Secondly, the slenderness of the valve stem renders it easily influenced by vibration of the vehicles with the result that changes in the relative positions of the needle and port occur which disturb the valve adjustment. This vibration is sometimes so severe that the needle will strike against the metal surrounding the valve port with the result that the latter is slowly enlarged and the needle is reduced in diameter thereby, in time, altering the setting of the valve.

I have provided an improved valve construction which overcomes these undesirable features. I provide the shaft 31, and the headed end 32 thereof, with an axial bore 42 extending entirely therethrough. The lower end of the bore 42 is provided with an enlarged counterbore 43 and with a smaller counterbore 44 continuing from the counterbore 43 into the bore 42. As will be seen, in Figure 2, the counterbore 43 provides, in conjunction with the bottom surface 46 of the recess 9, an enclosed chamber 47. Drilled passages 48, provided in the head 32 connect the chamber 47 with each cylinder chamber 34 so that fluid in the latter may flow into the chamber 47. Into the counterbore 44 is forcibly pressed a bushing 49, shown in detail in Figure 3, having a central bore 51 passing axially therethrough, a peripheral groove 52 extending therearound, and a slot 53 cut transversely of the bushing axis through the side wall thereof at the bottom of the groove. The groove 52, when the bushing is in place, provides an enclosed annular chamber 54. Passages 56 are drilled through the head 32 to communicate at one end with the annular chamber 54 and each, at the other end thereof, opening into one of the cylinder chambers 36. It will be seen that when counter-clockwise torque is applied to the shaft 31, as viewed in Figure 1, the fluid in the chambers 34 will be forced, by the advancing pistons 33, through the passages 48 into the chamber 47, upwardly into the central bore 51 of the bushing 49, through the slot 53 into the annular chamber 54 and then through the passages 56 into the cylinder chambers 36.

Means is provided for regulating the effective width of the slot 53 so as to control the flow of fluid between the cylinder chambers 34 and 36. Formed in the bore 42 intermediate its ends are screw threads 57 with which is engaged an exteriorly threaded plug 58 provided with an axial bore into which is forcibly pressed an end of a valve stem 59 whose lower end projects a distance into and is journaled in the bore 51 of the bushing 49 and is provided with a tapered tip 61. A slot 62 cut axially transversely through the upper ends of both the plug 58 and the valve stem 59 permits of the reception of the blade of a screw driver or other similar tool inserted through the open end of the bore 42 so that the plug may be rotated to advance it and the valve stem axially. This axial advancement of the valve stem will cause the tapered tip 61 thereof to traverse the slot 53, the shoulder where the large end of the taper merges with the straight outer surface of the shaft gradually covering more and more of the slot area until the slot is completely closed. In order to preserve the valve adjustment once it is made, I provide the plug 58 with an axial counterbore which forms in the plug a thin-walled skirt 63 in which is cut a plurality of notches 64 extending axially of the plug. By forcing a suitably shaped tool between the skirt and the valve stem the skirt segments may be flexed outwardly thereby diametrically expanding one end of the plug so that when the latter is inserted into the bore 42 the threads of the plug will engage the threads 57 with sufficient friction to resist all forces, other than torque deliberately applied, tending to rotate it and to disturb the adjustment of the valve.

It will be seen from the above description and upon inspection of the drawing that the valve structure is sufficiently rugged to withstand, without suffering material damage, more than normal rough handling, that the valve stem, being piloted in the bore of the ported bushing, is incapable of being affected by vibration and, regardless of whether the stem becomes slightly bent either during or after manufacture, that it will, during assembly, be forced into correct relation with the bushing, that no wear due to vibration can occur in either the valve or bushing, and that the valve is capable of easier and more certain micrometric adjustment than are the usual types of needle valves now in use.

I claim:

In a hydraulic shock absorber comprising a housing having a closed cylindrical recess therein containing fluid, a shaft having an axial bore therethrough disposed concentrically with and rotatable within said recess, abutments in and extending from a wall of said recess toward and contacting the periphery of said shaft to divide said recess into a pair of arcuate cylinders, wing pistons extending from said shaft into and dividing each arcuate cylinder into a pair of separate cylinder compartments, said shaft bore at one end thereof being provided with an enlarged counterbored portion forming, in conjunction with a surface of said housing, an enclosed fluid-receiving-chamber, means for conducting fluid from one compartment of a cylinder into said fluid-receiving chamber, a valve structure comprising a centrally bored bushing positioned in said shaft bore, at the end thereof adjacent said fluid-receiving chamber, having a single peripheral groove therearound and a slot cut through the wall of the bushing transversely of the bushing axis whereby the bushing bore and the peripheral groove are intercommunicating through the slot, said peripheral groove, when the bushing is positioned within the shaft bore, forming in conjunction with the periphery of the latter bore an annular chamber, said shaft having therein a radially extending duct in communication at one end with said annular chamber and at the other end with another of the cylinder compartments, a valve stem having an end portion journaled in said bushing bore, a portion of said journaled end of the stem within said bushing bore being provided with a periphery tapered with respect to the axis of the stem, and a cylindrical head at the other end of said valve stem, said head being peripherally threaded and in mesh with complementary threads formed in said shaft bore and having an axial counterbore to provide a skirt, said skirt being divided into a plurality of separate segments, and said segments being flexed outwardly to provide increased frictional engagement between the peripheral threads of said head and those of said shaft bore.

HUGH S. BEGG.